Figure 1:
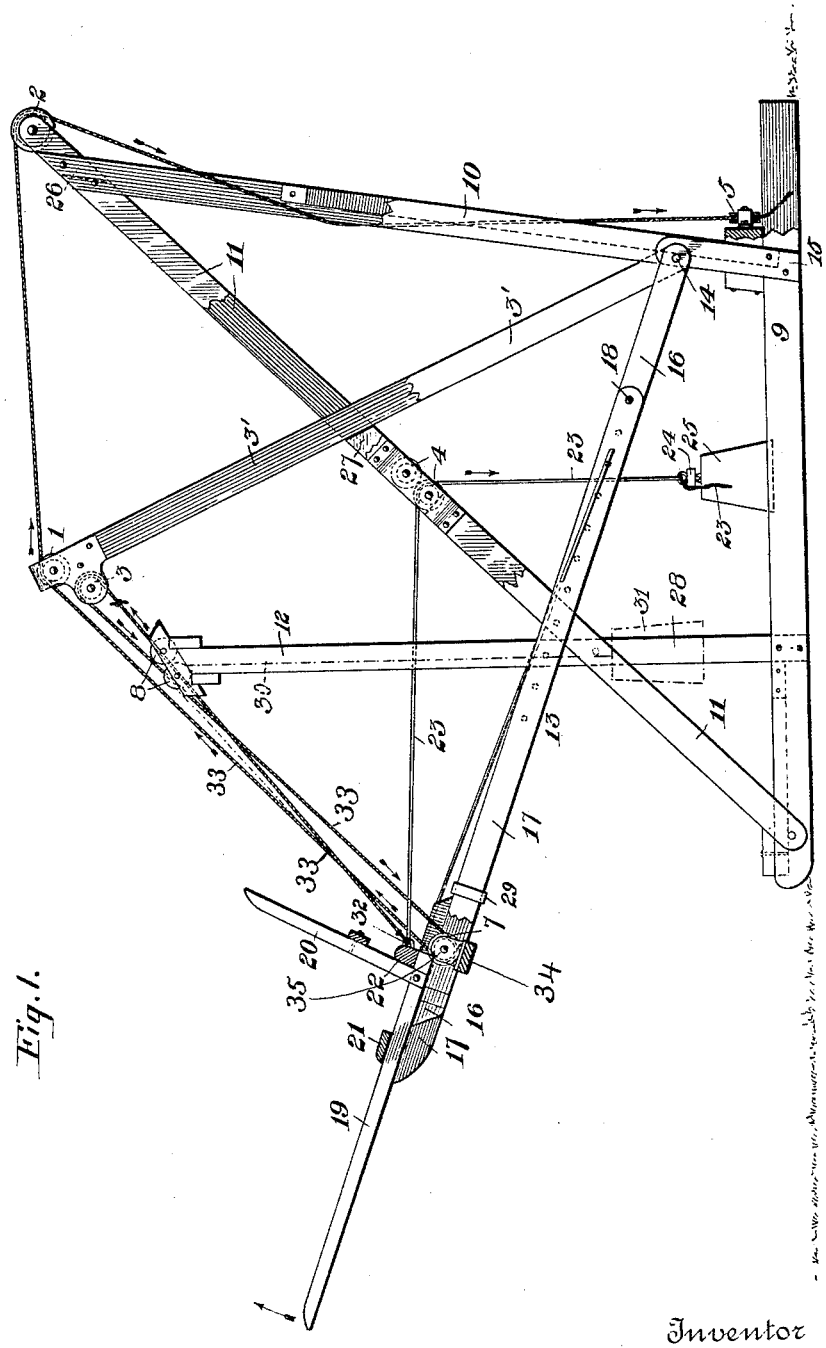

(No Model.) 2 Sheets—Sheet 1.

S. A. BLAKE.
HAY STACKING MACHINE.

No. 433,067. Patented July 29, 1890.

Witnesses
Inventor
Samuel A. Blake
By his Attorney
Benj. R. Catlin (No Model.) 2 Sheets—Sheet 2.
S. A. BLAKE.
HAY STACKING MACHINE.
No. 433,067. Patented July 29, 1890.
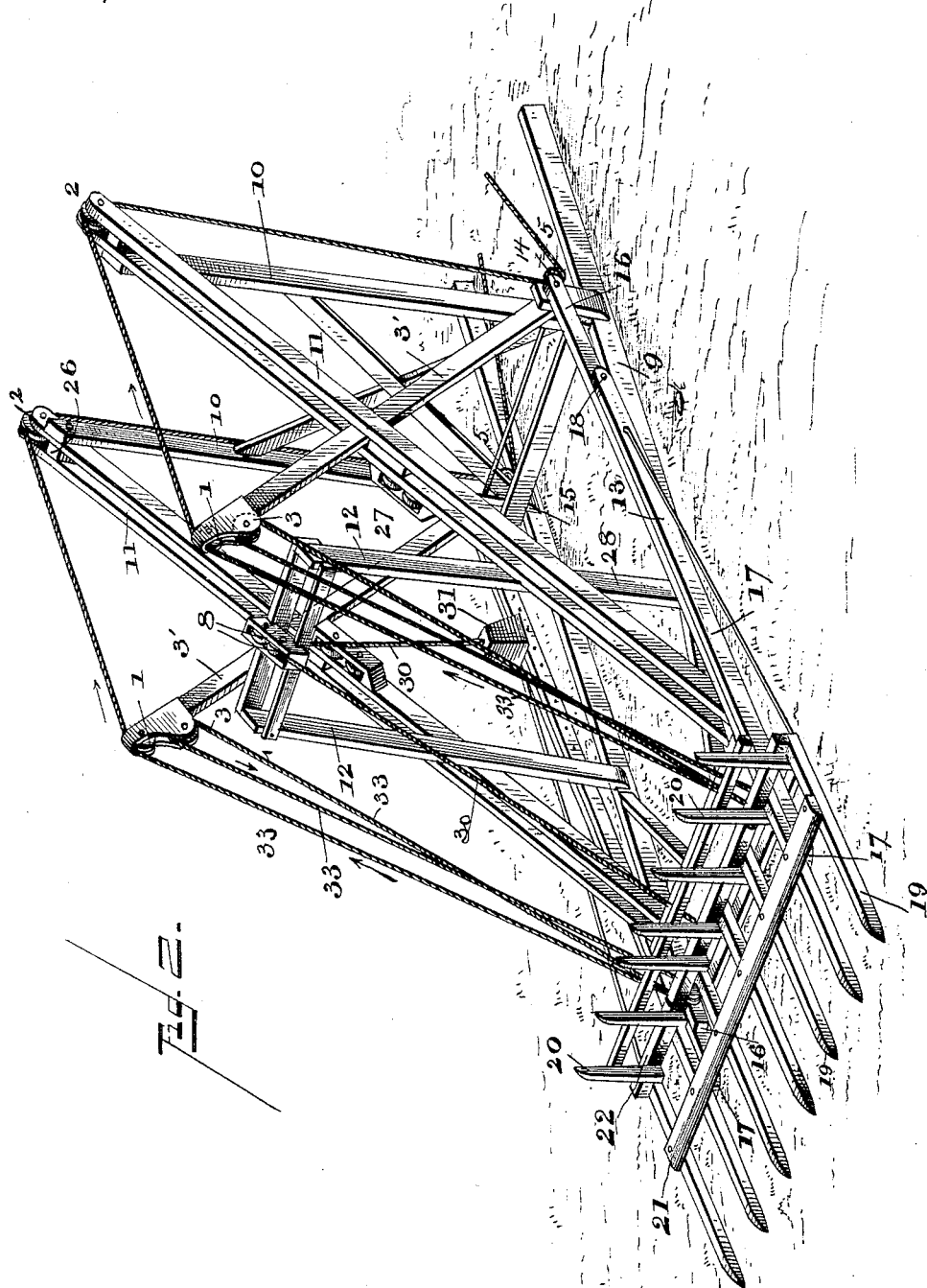
WITNESSES
F. L. Ourand
Edward Cashman
INVENTOR
Samuel A. Blake
by
Benj. R. Catlin Attorney

UNITED STATES PATENT OFFICE.

SAMUEL A. BLAKE, OF OSCEOLA, IOWA.

HAY-STACKING MACHINE.

SPECIFICATION forming part of Letters Patent No. 433,067, dated July 29, 1890.

Application filed September 26, 1889. Serial No. 325,112. (No model.)

*To all whom it may concern:*

Be it known that I, SAMUEL A. BLAKE, a resident of Osceola, in the county of Clarke and State of Iowa, have invented certain new and useful Improvements in Hay-Stacking Machines; and I do hereby declare the following to be a full, clear, and exact description of the invention, such as will enable others skilled in the art to which it pertains to make and use the same.

The object of the invention is to increase the efficiency of hay-stacking machines; and it consists in the construction hereinafter described and pointed out.

In the accompanying drawings, Figure 1 is a side elevation, partly in section, and Fig. 2 is a perspective, of the improved machine, the arrangement of counterbalancing-weights indicated in dotted lines in Fig. 1 only being shown.

Reference-number 9 indicates a ground or base frame supporting a rear truss 10 and braces 11, and also a truss or frame 12, all of which are rigidly connected and constitute the main frame of the machine, the several parts of which may be joined and braced in any improved manner. The braces 11 are preferably made double and their feet secured on each side of a runner or sill of the ground-frame.

13 indicates the rake-elevating lever-frame, having its fulcrum on the rod 14, passing through posts 15, secured to the ground-frame. The side bars of this lever-frame are made in two parts 16 and 17, one of which is provided with openings to receive a pin 18. Near the end of each compound bar its two members are embraced by a ring or band 29, the purpose of these rings and of the holes and pins being to permit variation in the length of the rake lever-frame. The main rake 19 is secured to the movable members 17 of the compound bar of the rake-frame, and pivotally secured to the teeth of this rake is the stop or head-rake 20, the movements of which are limited by the cross-bars 21 and 22 of the main rake.

3′ 3′ indicate levers having their fulcrums on rod 14 and moving between the two parts of the braces 11, respectively, their movement to the rear being limited by the block 26 and toward the front by block 27. These levers support pulleys 1 and 3, arranged, as indicated, in their upper extremities and journaled in any suitable block or bracket.

In operation this rake, being loaded with hay in the usual manner, is made to throw it upon a stack in process of building by the following-described mechanism: A suitable rope or chain 33 is secured to the rear cross-bar of the main rake near its connection with the lever-frame and passed about pulleys 3 7 1 2 5 on one side of the machine, and then about similar pulleys (not shown) on the other side, the end of the same being secured to the corresponding end of the main cross-bar of the rake. As will be readily understood, power applied to this rope at the rear of the machine in any usual manner will have the effect to move the rake-elevating frame about the rod 14 and raise it and the rake to a vertical position or to a point from which the contents of the rake are discharged upon a stack, the head-rake serving to suitably support the load during said operation. The contents of the rake having been discharged, it may be returned to a horizontal position for the reception of another load. As the rope is drawn through the pulleys, its two ends attached near the two ends of the rake raise it in an even and uniform manner, whether its load be evenly distributed or not, and as it continues to rise by the movement of the rake-raising frame about its fulcrum the pulley-levers 3′ 3′ also move about their fulcrums until these several levers are in an approximately-vertical position, the levers 3′ resting against blocks and the rake lever-frame against said levers 3′ 3′. As the stack grows in height, the elevating-frame can be lengthened by the adjustment of its side bars by the means above described. In Fig. 1 this rope is shown as wound about a post of the rear truss to aid in supporting the rake-frame, the position not being an operative one.

The above-described operation may be aided by the following subsidiary mechanism: To the braces 11, on the inside thereof, or in some cases between the two parts of each, are pulleys 4, which receive cords 23, attached to the main cross-bar of the rake, the opposite ends of said cords being attached to a bar 24, which sustains a weight 25. This weight acts in an obvious manner to assist the elevation of the rake and its load, and also to return the rake from a vertical position after it is unloaded, during which part of the operation the rope or chain moves in the groove of the upper pulley 4. It may also be used as a stop for the rake-lever frame to prevent its being thrown too far to the rear under any condition. As represented, however, the pulley-levers 3' would serve to stop the rearward movement of the rake, by reason of the cross-bar 34, secured to the outer end of the rake-elevating frame, coming in contact with the tops of said pulley-levers. The above-described weight also so counterbalances the rake in its descent that it falls without liability of jarring or injuring the machine.

At a suitable point on the ground-frame two posts 28 are secured, being also bolted to the braces 11, and between their upper ends, on suitable cross-bars, support-pulleys 8, arranged to receive a cord 30, one end of which is attached to the rake at 32 and the other provided with a counterbalancing-weight 31, as indicated in dotted lines. The operation of this device is similar to that described in connection with pulleys 4 4, and either or both constructions may be used, as found convenient. It will be noted that the construction is such as to secure an even and balanced movement of the rake and its frame both in its ascent and descent—a result which is very desirable in mechanism of this kind, and especially because it is to be operated by ordinary laborers. The weight mechanism is of special importance in this direction. It not only aids to start the upward movement of the load, but it checks any momentum with which it might happen to be thrown against the stack, and it also facilitates the starting of the return movement and also counteracts too great momentum in said return of the rake to the ground or floor.

The details of the machine may be varied by mechanical skill without departing from the invention. Though a single rope or chain has been described, it is obvious that the number of these is not material. In practice a rope or its equivalent will be used on each side of the machine. It is further evident that the number of pulleys may be increased, suitable supports being provided, and that the parts may be variously braced and strengthened. The elevating-ropes can be attached to the lever-frame instead of the cross-bar of the rake; but their attachment on both sides of the longitudinal central plane of the machine is of practical importance.

Having thus described my invention, what I desire to secure by Letters Patent is—

1. The combination of the ground-frame, the rake-elevating lever-frame, pulleys on said lever-elevating frame near the rake, the movable pulley-supporting levers having each two pulleys at its upper part, and the ropes connected to the rake near each end and passing over pulleys supported on said levers back to the pulleys first named, and thence to other pulleys on said movable levers, and thence to pulleys on the top of the frame, substantially as set forth.

2. In a stacking-machine, the combination of the rake-elevating lever-frame and rake, the cords attached near each end of the rake, and the movable levers having pulleys supported in their free ends, the braces inclosing pulleys between their side bars and the stops, substantially as set forth.

3. In a hay-stacking machine, the combination of the braces 11, consisting of two members each, with the ground-frame and posts 10, and supporting-levers 3', movable between the two members of the braces and with the rake and ropes, substantially as set forth.

In testimony whereof I have signed this specification in the presence of two subscribing witnesses.

SAMUEL A. BLAKE.

Witnesses:
W. G. AGNEW,
F. L. GUCHES.